(12) United States Patent
Dahlback et al.

(10) Patent No.: US 9,289,718 B2
(45) Date of Patent: Mar. 22, 2016

(54) WATER ADSORPTION DEVICE

(71) Applicants: Per Dahlback, Uppsala (SE); Fredrik Edstrom, Uppsala (SE); Jonas Wamstad, Uppsala (SE)

(72) Inventors: Per Dahlback, Uppsala (SE); Fredrik Edstrom, Uppsala (SE); Jonas Wamstad, Uppsala (SE)

(73) Assignee: Airwatergreen AB, Uppsala (SE)

( * ) Notice: Subject to any disclaimer, the term of this patent is extended or adjusted under 35 U.S.C. 154(b) by 0 days.

(21) Appl. No.: 14/289,842

(22) Filed: May 29, 2014

(65) Prior Publication Data

US 2014/0352536 A1 Dec. 4, 2014

(30) Foreign Application Priority Data

May 31, 2013 (SE) ...................................... 1350670

(51) Int. Cl.
*B01D 53/26* (2006.01)
*E03B 3/28* (2006.01)

(52) U.S. Cl.
CPC ............... *B01D 53/261* (2013.01); *B01D 53/26* (2013.01); *E03B 3/28* (2013.01); *B01D 2259/40094* (2013.01); *B01D 2259/40096* (2013.01); *B01D 2259/4508* (2013.01)

(58) Field of Classification Search
CPC .......... B01D 2259/40094; B01D 2259/40096; B01D 2259/4508; B01D 53/26; B01D 53/261; E03B 3/28
See application file for complete search history.

(56) References Cited

U.S. PATENT DOCUMENTS

2005/0044862 A1  3/2005  Vetrovec et al.

FOREIGN PATENT DOCUMENTS

| JP | 2002159827 A | 6/2002 |
|---|---|---|
| WO | 9006165 A1 | 6/1990 |
| WO | 9966136 A1 | 12/1999 |
| WO | 2004009218 A1 | 1/2004 |
| WO | 2011062554 A1 | 5/2011 |

OTHER PUBLICATIONS

Extended European Search Report, dated Nov. 18, 2014, from corresponding EP application.

*Primary Examiner* — Christopher P Jones
(74) *Attorney, Agent, or Firm* — Young & Thompson

(57) ABSTRACT

The present invention relates to a device for adsorbing water from gas using water adsorption material and a method of adsorbing water from gas.

20 Claims, 3 Drawing Sheets

WATER ADSORPTION DEVICE

FIELD OF INVENTION

The present invention relates to a device for adsorbing water from a gas and a method of adsorbing water from gas.

BACKGROUND

There are many ways of extracting water from air but many of them struggling with efficiency and that they demand a lot of energy.

SUMMARY OF INVENTION

The object of the present invention is to provide a device which overcomes the drawbacks of prior art.

In a first aspect the present invention relates to a water adsorption device comprising:
  a housing having a sealable inlet and a sealable outlet;
  a container within the housing, wherein the container has an inlet and an outlet and wherein the inlet of the container communicates with the sealable inlet of the housing and the outlet of the container communicates with the sealable outlet of the housing;
  a water adsorbing material confined within the container;
  whereby a gas flow may be allowed to flow from the sealable inlet of the housing through the container in contact with the water adsorbing material in the container to the sealable outlet of the housing;
  a heating device arranged in thermal contact with the water adsorbing material or the container; and
  wherein the housing has at least one wall with an inner surface and an outer surface wherein the inner surface is at least partly facing the inlet or the outlet of the container,
  wherein at least one of the container and the inner surface of the wall has an emissivity value of not more than 0.5, and
  wherein the outer surface of the wall has an emissivity value of at least 0.6.

In a second aspect the present invention relates to a method of adsorbing water from a gas comprising:
  a. providing a device according to the first aspect of the invention;
  b. bringing a gas flow into contact with the water adsorbing material;
  c. letting the water adsorbing material adsorb moisture or water from the gas;
  d. sealing the housing;
  e. heating the water adsorbing material until the space between the container and the inner surface of the housing is saturated with moisture;
  f. continuing heating of the water adsorbing material;
  g. collecting condensed water; and
  h. unsealing of the housing.

The embodiments presented below are applicable to both aspects of the present invention.

DETAILED DESCRIPTION OF THE INVENTION

In the present application "water adsorbing material", "water adsorption material" and "hygroscopic material" are used interchangeably.

The device according to the present invention is designed for water adsorption from a gas, for example from air. The device may be integrated into another device or may be a standalone device.

Figure 1:
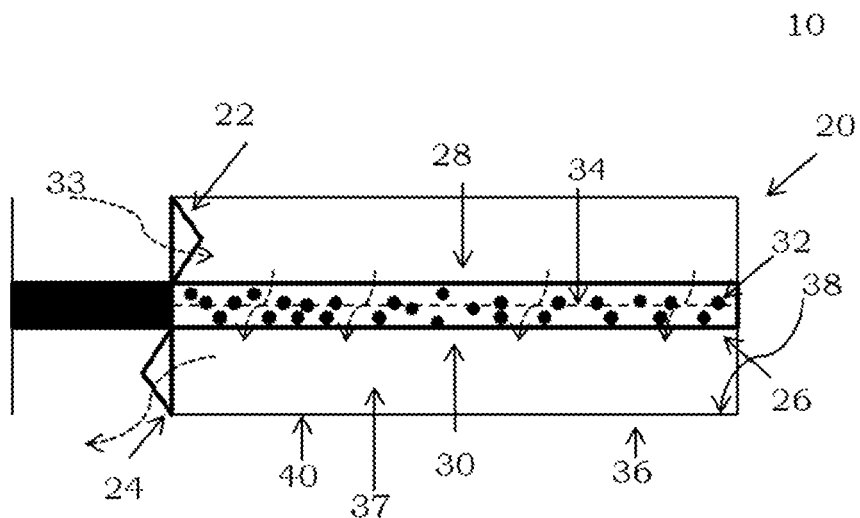
FIG. 1 is a schematic figure of a cross section of the device according to the present invention.

Referring now to FIG. 1. The water adsorption device according to the present invention 10 comprises a housing 20 with a sealable inlet 22 and a sealable outlet 24 and where said inlet and the outlet are both sealable using any suitable means to close and seal said inlet and outlet. The housing comprises a container 26 having an inlet 28 and an outlet 30 which both are in communication with the sealable inlet 22 and the sealable outlet 24 of the housing respectively. The container comprises a water adsorption material 32 which may be any suitable material for example molecular sieves, active carbon, zeolite, silica gel, LiCl, CaCl, $NaNO_3$, wood, sulphates or any suitable material known to a person skilled in the art or combinations thereof. The inlets and the outlets of the housing and the container are arranged so that the gas 33 may flow from the sealable inlet 22 of the housing through inlet 28 of the container so that the gas comes in contact with the water adsorbing material 32. The gas will then exit the container 26 through the outlet 30 and out through the sealable outlet 24 of the housing 20. The dotted arrows in FIG. 1 represent the gas flow. A heating device 34 is arranged in thermal contact with the water adsorbing material 32 and/or the container 26. A wall 36 of the housing is arranged at least partly facing the inlet and/or the outlet of the container forming a space 37 between the wall 36 and the container 26. For example the wall may be arranged opposite to the outlet 30 of the container in the direction of the gas flow and/or opposite to the inlet 28 of the container. The wall has an inner and an outer surface 38 and 40 respectively. The container may be in the form of a net, a cage or a perforated surface and may be made of for example a metal or a metal alloys, for example aluminium.

The heating device may be manoeuvred using electricity, fuel cells, solar energy or in any other suitable way and the heat could be supplied via electricity, microwaves (for example via the microwave oven principle) or via solar energy.

The heating device may also be connected to a sealing control mechanism to optimize the process of when the sealable inlet and sealable outlet should be opened and closed and when the heating procedure of the water adsorption material should start. Additionally, the housing is preferably constructed in such a way that the gas volume inside a sealed housing remains substantially constant during heating of the water adsorbing material. This may be accomplished by securing or locking the sealing after closing or using a check valve as a sealing.

The device may further comprise a pump or a fan in order to increase the flow of gas into the housing and through the container with the water adsorption material. A pump may also reduce the pressure in the housing when it is sealed. The pump may replace the heating device or may be a complement to the heating device. When the housing is sealed, the pump would reduce the pressure in the sealed housing in order to shift the vapour pressure balance between the gas in the housing and the hygroscopic material/water adsorbing material. The water would then condense and/or be released from the water adsorbing material and can easily be collected. The pressure in the sealed housing may be reduced using a pump or any other suitable means. If the device comprises a heating device as well, the reduction of pressure could be done prior, during or after heating the hygroscopic material.

The present invention is based on the fact that a water adsorption material confined in a container adsorbs, and to some extent maybe also absorbs, water from the surrounding gas, preferably air, and preferably to the point of saturation. Thus, after having allowed the water adsorption material to adsorb water, the housing is sealed using a lid or any suitable cover and the water adsorption material is then heated. The sealing should be performed in such a way that the gas volume in the sealed container does not expand during heating. The process of releasing the water from the water adsorbing material is driven by the difference in vapour pressure of the water in the gas and the water adsorbed in the water adsorbing material. The amount of water released from the water adsorption material to the surroundings can be described by:

$$dm/dt = CA\Delta P = CA(P_1(T_1) - P_2(T_2))$$

where C is a material constant, A is the contact surface between the gas the water adsorption material and P is the vapour pressure. When the gas is saturated, i.e. 100% relative humidity, the vapour pressure of the adsorbed water in the water adsorption material could still be even higher. The higher vapour pressure and the saturation of the gas make the adsorbed water liquefy. The present invention lowers the amount of energy needed since instead of vaporizing the adsorbed water the present invention only requires the energy to break the bonding between the water and the water adsorption material. This is a result of the fact that vaporizing requires both energy to break the bond between the adsorbed water and the water adsorption material and energy to vaporize the water.

Unlike the prior art the present invention is therefore not dependent on an internal circulation of air or cooling systems to function. The use of non-insulating or heat conductive material in the present invention makes it unnecessary to use a cooling system.

During the heating of the water adsorption material the water adsorbed on or to the material will vaporize. When the surrounding gas is saturated with moisture additional heating may cause some of the adsorbed water to go from adsorbed to free liquid water. Additionally, by having walls of heat conducting material (or non-insulating material) the vaporized water may condense on the walls, shifting the equilibrium, facilitating more water to be vaporized from the water adsorption material. The walls of the container and/or the housing may be made of but not limited to metals or metal alloys. The walls of the housing are preferably made of a non-transparent material.

Figure 2:
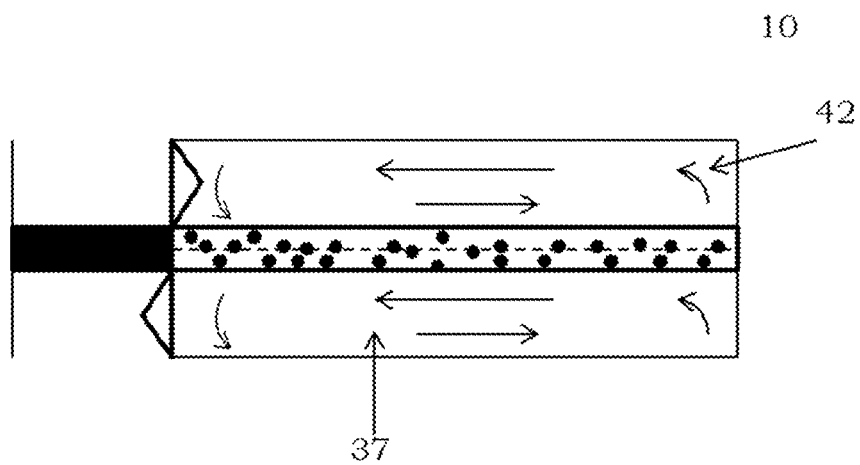
FIG. 2 discloses a schematic figure of a cross section of the device according to the present invention.
Figure 3:
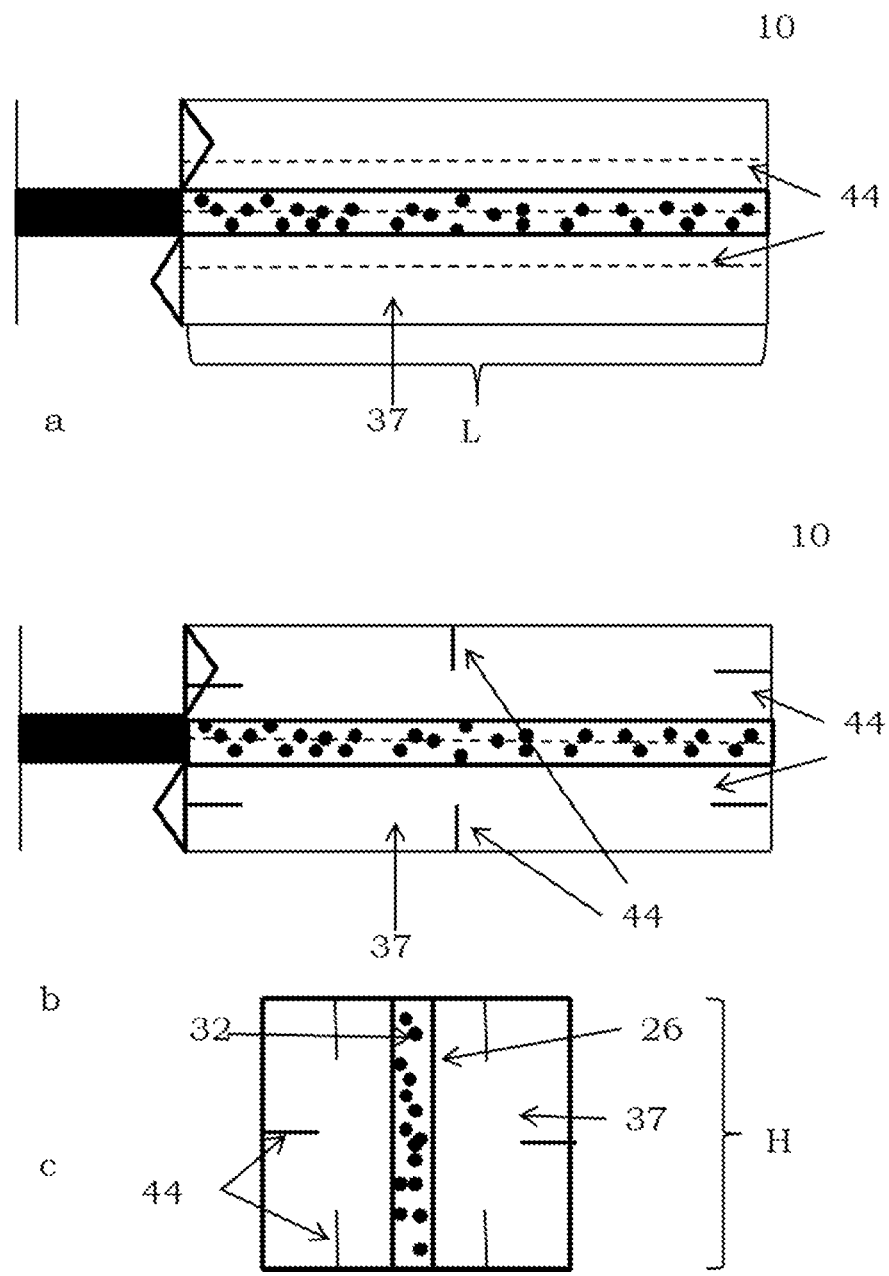
FIG. 3 discloses a schematic figure of a cross section of the device according to the present invention comprising convection disturber.

Referring now to FIGS. 2 and 3. During the heating of the water adsorbing material when the inlet and the outlet of the housing are sealed, a heat transfer through convection 42 may occur in the space 37 between the container and the housing due to the temperature difference between the container and the inner surface of the housing, see FIG. 2, the so called Nusselt effect. In order to limit said convection the space 37, which may cause a transfer of heat from the container to the housing, a convection disturber 44 may be arranged between the container and the inner surface of the housing or on at least one of the inner surfaces of the housing on each side of the container, see FIG. 3. The convection disturber 44 may also have an isolating effect, a thermos effect, around the container and the water adsorption material. In FIG. 3a a convection disturber 44 is arranged on each side of and along the container forming a space 46. The disturber 44 in Fig. 3a is perforated wall preferably having the length L and height H so that air heated in the space between the convection disturber and the container is kept within said space. The disturber 44 may also be in the form of protruding walls or parts from at least one of the inner surfaces of the housing, see FIG. 3b and c. The walls or parts protruding from the inner surface/surfaces of the housing may extend out from the inner surface so that convective flow is hindered or at least disturbed but at the same time allows vapour to enter the space 37 and that air and vapour may exit through the sealable outlet of the housing 24. The convection disturber may be made of any material that exhibits a low emissivity value and a low heat conducting value, for example the disturber 44 may be made of plastic, aluminium, aluminium foil stainless steel or silver.

The housing may be thermally isolated from the container with the water adsorbing material and heating device so that the housing is not heated during heating of the water adsorbing material.

The present inventors have found that the heat emitting features of the container material or the surface of the container 26, the inner surface 38 of the housing and the outer surface 40 of the housing are important in order to make the system efficient. The energy or heat provided to the water adsorption material should preferably not be radiated into the space 37 between the container and the wall of the housing, however any heat or energy adsorbed by the wall of the housing should be radiated out from the outer surface of the housing. Therefore the emissivity values (in the whole spectrum, preferably in the IR spectrum) of the container or the surface of the container, and the inner surface 38 and the outer surface 40 of the housing are important. The container, the convection disturber and the inner surface of the housing should preferably have a low heat conducting value.

The radiation loss to a cooler surrounding when a blackbody is radiating energy is according to Stefan Boltzmann law $$P = \epsilon \sigma A(T^4 - T_C^4)$$

where $\epsilon$ is the emissivity value of the blackbody, Stefan's constant, A radiating area, T temperature of radiator and $T_C$ temperature of surrounding.

In one embodiment the emissivity value of the container or the surface of the container is not more than 0.5, for example 0.45 or less, or 0.30 or less, or 0.20 or less, or 0.10 or less, or 0.05 or less. Examples of ranges may be 0.5-0.01, or 0.30-0.01, or 0.30-0.05, or 0.20-0.01, or 0.20-0.05, or 0.10-0.05.

In one embodiment the inner surface is not more than 0.5, for example 0.45 or less, or 0.30 or less, or 0.20 or less, or 0.10 or less, or 0.05 or less. Examples of ranges may be 0.5-0.01, or 0.30-0.01, or 0.30-0.05, or 0.20-0.01, or 0.20-0.05, or 0.10-0.05.

In one embodiment the emissivity value of the container or the surface of the container and the inner surface is 0.5 or less, for example 0.45 or less, or 0.30 or less, or 0.20 or less, or 0.10 or less, or 0.05 or less. Examples of ranges may be 0.5-0.01, or 0.30-0.01, or 0.30-0.05, or 0.20-0.01, or 0.20-0.05, or 0.10-0.05.

In one embodiment the container and/or the inner surface of the housing is made of steel, stainless steel, aluminium, aluminium foil or silver. In one embodiment the container and/or the inner surface of the housing is polished, i.e. polished so that radiation in the IR spectrum is lowered.

In one embodiment the emissivity value of the outer surface is at least 0.6, for example 0.65 or more, or 0.70 or more, or 0.80 or more, or 0.90 or more. Example of ranges may be 0.60-0.90, or 0.70-0.90.

In one embodiment the outer surface may be painted, anodized or coated to obtain an emissivity value of at least 0.70. By painting the outer surface preferably with a pale paint, for example black or pale black the emissivity value may be 0.80 or more, or 0.90 or more.

In one embodiment the container or the container surface and the inner surface has an emissivity value of 0.20 or less, and the outer surface has an emissivity value of 0.80 or more.

In one embodiment the housing of the present invention is substantially made of a non-transparent material such as a metal or a metal alloy, for example aluminum. The aluminum may be further treated to improve the emissivity value.

Figure 4:
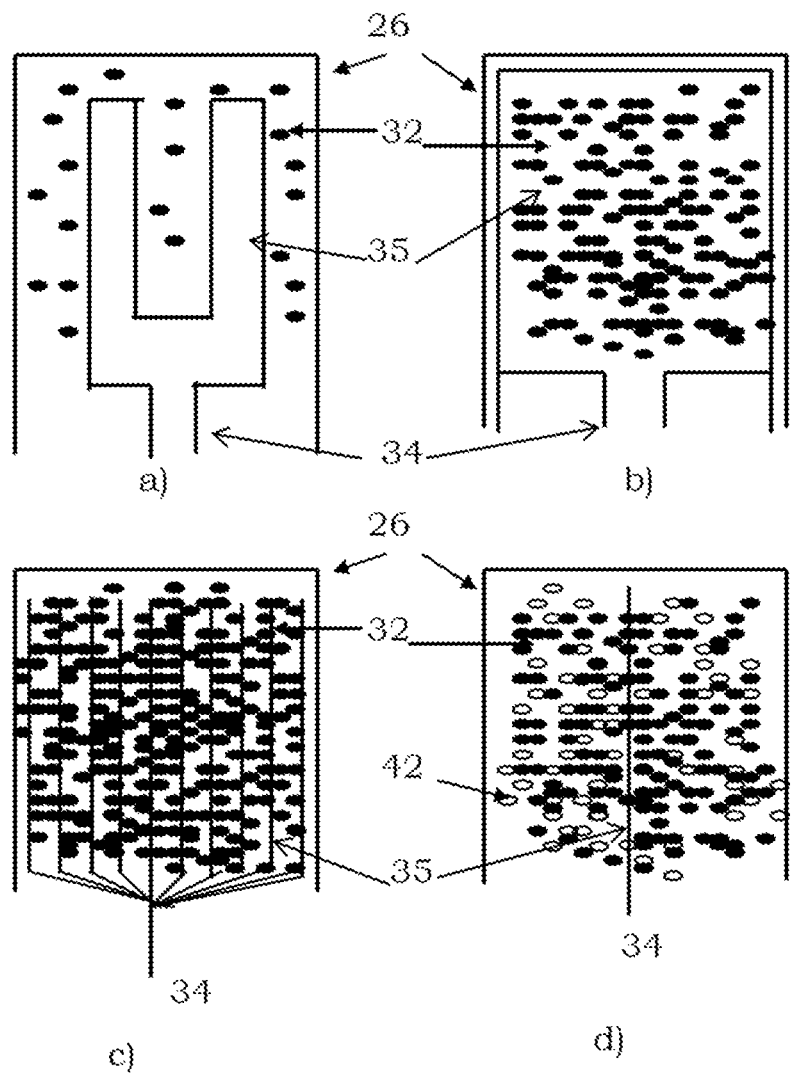
FIG. 4 are a schematic figures of a cross section of the container with water adsorbing material and heating device.

Referring now to FIG. 4. In one embodiment the heating device 34 comprises two or more heating elements 35 arranged in direct contact with the water adsorption material 32. The two or more heating elements 35 may be arranged in any suitable way in the hygroscopic or water adsorbing material. The heating device may have a Y or fork shape, see FIG. 4a, or a substantially flat rectangular surface, see FIG. 4b, or may comprise several heating elements, see FIG. 4c. By having many heating elements or a large surface of heating element the heating will become much more efficient and more evenly distributed. In FIG. 4d small metal or heat conducting particles 42 are arranged in order to maintain the heat and/or conduct An advantage of the present invention is that the present invention does not need a surface for the vaporized water to condense on, the water may condense spontaneously in the gas/air, and the water adsorbed on the water adsorbing material may be released without vaporizing first. The releasing of water without vaporizing first saves energy since the energy required to vaporize is not needed.

Without being bound by theory it is believed that if the water adsorbing material is heated very fast for example by using high power a non-linear energy value is obtained. For example the heating may be performed using a power of at least 200 W/kg, or 300 W/kg or more, or 350 W/kg or more, or 400 W/kg or more, or 450 W/kg or more, or 500 W/kg or more. For example, by increasing the power from 250 W/kg to 500 W/kg the energy consumption decreased with around 40%.

The present invention is aimed at extracting water from gas, preferably air, to either produce water or remove the water from the gas. The latter could be used for example, but not limited to, for dehumidification of indoor environments or in air-conditioning devices.

The invention claimed is:

1. A water adsorption device comprising:
   a housing having a sealable inlet and a sealable outlet;
   a container within the housing, the container having an inlet and an outlet, the inlet of the container communicating with the sealable inlet of the housing and the outlet of the container communicating with the sealable outlet of the housing;
   a water adsorbing material confined within the container, a gas flow flowing from the sealable inlet of the housing through the container in contact with the water adsorbing material in the container to the sealable outlet of the housing;
   a heating device disposed in thermal contact with the water adsorbing material or the container, and
   wherein the housing has at least one wall with an inner surface and an outer surface, the inner surface at least partly facing the inlet or the outlet of the container,
   wherein the container and the inner surface of the housing have an emissivity value of not more than 0.5, and
   wherein the outer surface of the housing has an emissivity value of at least 0.6.

2. The device according to claim 1, wherein the outer surface of the housing is painted, anodized or coated resulting in an emissivity value of at least 0.7.

3. The device according to claim 1, wherein the outer surface is painted black resulting in an emissivity value of at least 0.8.

4. The device according to claim 1, wherein the container has an emissivity value of not more than 0.3.

5. The device according to claim 3, wherein the container has an emissivity value in the range of 0.1-0.05.

6. The device according to claim 1, wherein the inner surface has an emissivity value of not more than 0.3.

7. The device according to claim 3, wherein the inner surface has an emissivity value in the range of 0.1-0.05.

8. The device according to claim 1, wherein the housing is substantially made of a non-transparent material.

9. The device according to claim 1, wherein the heating device comprises two or more heating elements disposed in direct contact with the water adsorption material.

10. The device according to claim 1, wherein a convection disturber is disposed in the housing between the container and the inner surface of the housing or on at least one of the inner surfaces of the housing on each side of the container.

11. A method of adsorbing water from a gas, the method comprising:
   providing a device according to claim 1;
   bringing a gas flow into contact with the water adsorbing material;
   letting the water adsorbing material adsorb moisture or water from the gas;
   sealing the housing;
   heating the water adsorbing material until the space between the container and the inner surface of the housing is saturated with moisture;
   continuing heating of the water adsorbing material;
   collecting condensed water; and
   unsealing of the housing.

12. The method according to claim 11, wherein the heating is performed using a power of at least 300 W/kg.

13. The device according to claim 4, wherein the container has an emissivity value of not more than 0.1.

14. The device according to claim 6, wherein the inner surface has an emissivity value of not more than 0.1.

15. The device according to claim 8, wherein the non-transparent material is a metal.

16. The device according to claim 15, wherein the metal is aluminum.

17. The method according to claim 12, wherein the heating is performed using a power of at least 350 W/kg or more.

18. The method according to claim 17, wherein the heating is performed using a power of at least 400 W/kg or more.

19. The method according to claim 18, wherein the heating is performed using a power of at least 450 W/kg or more.

20. The method according to claim 19, wherein the heating is performed using a power of at least 500 W/kg or more.

* * * * *